(12) United States Patent
Boughtwood (10) Patent No.: US 9,870,870 B2
(45) Date of Patent: Jan. 16, 2018

(54) ENERGY STORAGE APPARATUS

(71) Applicant: Martin Hugh Boughtwood, Mid Glamorgan (GB)

(72) Inventor: Martin Hugh Boughtwood, Mid Glamorgan (GB)

(73) Assignee: Deregallera Holdings LTD, Cardiff (GB)

( * ) Notice: Subject to any disclaimer, the term of this patent is extended or adjusted under 35 U.S.C. 154(b) by 23 days.

(21) Appl. No.: 14/413,152

(22) PCT Filed: Jul. 5, 2013

(86) PCT No.: PCT/GB2013/051783
§ 371 (c)(1),
(2) Date: Jan. 6, 2015

(87) PCT Pub. No.: WO2014/006415
PCT Pub. Date: Jan. 9, 2014

(65) Prior Publication Data
US 2015/0155104 A1 Jun. 4, 2015

(30) Foreign Application Priority Data

Jul. 6, 2012 (GB) .................................. 1212051.5

(51) Int. Cl.
*H01G 9/15* (2006.01)
*H01G 7/02* (2006.01)
*H01G 7/06* (2006.01)
*H01G 9/07* (2006.01)
*H01G 4/20* (2006.01)

(52) U.S. Cl.
CPC ................ *H01G 9/15* (2013.01); *H01G 4/20* (2013.01); *H01G 7/02* (2013.01); *H01G 7/06* (2013.01); *H01G 9/07* (2013.01); *Y02T 10/7022* (2013.01)

(58) Field of Classification Search
CPC .. H01G 4/02; H01G 4/20; H01G 7/02; H01G 7/06; H01G 9/07; H01G 9/15
See application file for complete search history.

(56) References Cited

U.S. PATENT DOCUMENTS 2,909,662 A * 10/1959 Von Hippel ........... B82Y 10/00
250/370.01
3,716,742 A * 2/1973 Nakayama ............... H01J 11/00
313/587

(Continued)

FOREIGN PATENT DOCUMENTS

CN 1113598 12/1995
CN 1572007 1/2005

(Continued)

OTHER PUBLICATIONS

International Preliminary Report on Patentability for International Application No. PCT/GB2013/051783 dated Jan. 6, 2015, 9 pages.
International Search Report for International Application No. PCT/GB2013/051783 dated Apr. 22, 2014, 6 pages.
International Written Opinion for International Application No. PCT/GB2013/051783 dated Apr. 22, 2014, 8 pages.

(Continued)

*Primary Examiner* — David M Sinclair
(74) *Attorney, Agent, or Firm* — TraskBritt (57) ABSTRACT

Energy storage apparatus comprising: a porous conductor substrate, an insulator layer in contact with inner surfaces of the porous conductor substrate, and a conductor layer in contact with outer surfaces of the insulator layer.

24 Claims, 6 Drawing Sheets

(56) References Cited

U.S. PATENT DOCUMENTS

| | | | |
|---|---|---|---|
| 4,342,066 A | 7/1982 | Kulper | |
| 5,742,471 A * | 4/1998 | Barbee, Jr. | H01G 4/10 29/25.42 |
| 6,215,651 B1 | 4/2001 | Takada et al. | |
| 6,333,844 B1 | 12/2001 | Nakamura | |
| 6,430,033 B1 * | 8/2002 | Mitsui | H01G 9/0036 252/62.2 |
| 2004/0136140 A1 | 7/2004 | Kurosawa et al. | |
| 2005/0286211 A1 * | 12/2005 | Pinnow | G11C 13/0011 361/523 |
| 2006/0286760 A1 | 12/2006 | Kirschbaum | |
| 2007/0030623 A1 | 2/2007 | Clemens et al. | |
| 2007/0146969 A1 | 6/2007 | Naito | |
| 2010/0214718 A1 | 8/2010 | Yeh | |
| 2010/0254071 A1 * | 10/2010 | Nishimura | H01G 9/0032 361/524 |
| 2010/0302709 A1 * | 12/2010 | Dreissig | H01G 9/035 361/505 |
| 2011/0310530 A1 * | 12/2011 | Laor | H01G 4/33 361/524 |
| 2014/0036416 A1 * | 2/2014 | Ishimoto | H01G 9/07 361/529 |

FOREIGN PATENT DOCUMENTS

| | | |
|---|---|---|
| CN | 1883021 | 12/2006 |
| EP | 953996 A2 | 11/1999 |
| GB | 2486530 A | 6/2012 |
| JP | 0487317 A | 3/1992 |
| JP | 09115768 A | 5/1997 |
| JP | H09306787 A | 11/1997 |
| JP | H10308613 A | 11/1998 |
| JP | 2007096284 A | 4/2007 |
| JP | 2010199579 A | 9/2010 |
| JP | 2012129531 A | 7/2012 |
| WO | 2010023575 A1 | 3/2010 |

OTHER PUBLICATIONS

Chinese Office Action for Chinese Application No. 201380036181 dated Dec. 28, 2016, 19 pages.

Chinese First Search for Chinese Application No. 201380036181 dated Aug. 11, 2016, 2 pages.

Japanese Notification of Reasons for Refusal for Japanese Application No. 2015-519358 dated May 29, 2017, 10 pages.

* cited by examiner

FIG. 7 ized state; a conductor layer in contact with the first electrical storage layer; and a second electrical storage layer in contact with the conductor layer and operative to store energy in a polarized state.

ENERGY STORAGE APPARATUS

CROSS-REFERENCE TO RELATED APPLICATIONS

This application is a national phase entry under 35 U.S.C. §371 of International Patent Application PCT/GB2013/051783, filed Jul. 5, 2013, designating the United States of America and published in English as International Patent Publication WO 2014/006415 A2 on Jan. 9, 2014, which claims the benefit under Article 8 of the Patent Cooperation Treaty and under 35 U.S.C. §119(e) to Great Britain Patent Application Serial No. 1212051.5, filed Jul. 6, 2012, the disclosure of each of which is hereby incorporated herein in its entirety by this reference.

TECHNICAL FIELD

The present invention relates to energy storage apparatus and, particularly, but not exclusively, to energy storage apparatus for use in powering electrical devices such as electric vehicles.

BACKGROUND

The limitations of conventional electric batteries used to power electrical vehicles are well documented in the art with battery weight and charging time significantly limiting energy storage potential. Battery capacity and weight are also significant factors in portable electronic devices.

BRIEF SUMMARY

This disclosure has identified the need for an improved form of energy storage device for overcoming, or at least alleviating, problems associated with the prior art.

In accordance with a first aspect of the disclosure, there is provided energy storage apparatus comprising: a porous conductor substrate, an insulator layer in contact with inner surfaces of the porous conductor substrate, and a conductor layer (e.g., outer conductor layer) in contact with outer surfaces of the insulator layer.

In this way, an energy storage apparatus is provided with a capacitor structure in which the contact area between the porous conductor substrate and the insulator layer is significantly increased relative to a conventional plate-form capacitor in which the contact area is limited to the cross-sectional area of the conductor plate.

In one embodiment, the porous conductor substrate defines a network of interconnected voids (e.g., with each void being connected to an outer surface of the porous conductor substrate).

In one embodiment, the network of interconnecting voids extends from one lateral side of the porous conductor substrate to an opposed lateral side of the porous conductor substrate.

In one embodiment, the porous conductor substrate has an average effective pore diameter of between 10 nm and 300 nm (e.g., 20 nm to 100 nm or 50 nm to 100 nm).

In one embodiment, the porous conductor substrate is formed by a sol-gel process.

In one embodiment, the porous conductor substrate is a carbon aerogel.

In one embodiment, the porous conductor substrate is substantially planar.

In one embodiment the insulator layer is formed on the inner surfaces of the porous conductor substrate (e.g., as a solid layer).

In one embodiment the conductor layer is formed on the outer surfaces of the insulator layer (e.g., as a solid layer).

In one embodiment, the insulator layer is additionally in contact with (e.g., formed on) exterior surfaces of the porous conductor substrate.

In one embodiment, the insulator layer comprises first and second sequentially applied coatings of insulator material. In this way, risk of defects or "pinholes" extending through the total thickness of the insulator layer may be reduced since any one layer is unlikely to form defects in the same location on two separately formed layers. In one embodiment, the insulator layer further comprises a third coating applied after the second coating of insulator material (e.g., to further reduce the risk of defects extending through the total thickness of the insulator layer).

In one embodiment, each of the first to third coatings of insulator material has a thickness of between 2 nm and 10 nm (e.g., around 4 nm). In this way, the dielectric strength of each coating may be optimized as generally the dielectric strength properties of a material will usually improve (per thickness) with reduction in thickness.

In one embodiment, the insulator layer comprises a first layer formed from a first insulator material and a second layer formed from a second insulator material different from the first material. In this way, a multilayer dielectric may be provided in which the benefits of both materials may be realized.

In one embodiment, the first insulator material has a higher dielectric strength than the second insulator material (e.g., at least 10 times, at least 50 times or at least 100 times the dielectric strength of the second material). In one embodiment, the first insulator material comprises silicon oxide or diamond-like carbon.

In one embodiment, the second material has a higher dielectric constant than the first material. In one embodiment, the second material comprises strontium titanate, titanium oxide or a polymer layer (e.g., applied by dipping or rolling).

In one embodiment, at least one or both of the first and second layers has a thickness less than about 50 nm (e.g., less than about 20 nm). In this way, the thickness of each layer may be selected to be blow the De Broglie wavelength of the other layer allowing voltage performance to be retained as if the other material was effectively almost "not there." In one embodiment, at least one of the first and second layers has a thickness of approximately 10 nm.

In one embodiment, each or at least one of the first and second layers has a thickness greater than about 5 nm (e.g., to reduce effective leakage due to quantum tunneling).

In one embodiment, the second layer has a thickness that is substantially equal to or less than the thickness of the first layer.

In one embodiment, the insulator layer further comprises a third layer formed from an insulator material different from the second insulator material and applied to the second layer.

In one embodiment, the third layer has a higher dielectric field strength than the second insulator material (e.g., at least 10 times, at least 50 times or at least 100 times the dielectric strength of the second material). In one embodiment, the third layer is formed from the same material as the first layer.

In one embodiment, the conductor layer has a thickness of between 1 nm and 20 nm.

In one embodiment, the insulator layer comprises: a first electrical storage layer operative to store energy in a polarized configuration when a voltage is applied across the porous conductor substrate and conductor layer (e.g., with the first electrical storage layer having a breakdown voltage above the threshold voltage), and a second electrical storage layer configured to change between an electrically insulative configuration and an electrically conductive configuration, with transition from the electrically insulative configuration to the electrically conductive configuration occurring in response to application of a voltage exceeding a threshold voltage across the porous conductor substrate and the conductor layer (e.g., with the second electrical storage layer having a transition voltage (at which the change from the electrically insulative configuration to the electrically conductive configuration occurs) at or below the component of the threshold voltage across the second electrical storage layer prior to transition from the electrically insulative configuration to the electrically conductive configuration).

In this way, before energy is stored by polarization, work must be done to convert the second electrical storage layer from the electrically insulative configuration to the electrically conductive configuration, thereby increasing the storage capacity of the device. This additional stored energy is then released as the second electrical storage layer converts back to the electrically insulative configuration during a discharging stage.

In one embodiment, the threshold voltage is at least 100 volts (e.g., at least 1000 volts or even at least 10,000 volts).

In one embodiment, the second electrical storage layer is ionizable and the electrically conductive configuration is an ionized configuration generated by applying a voltage equal to or exceeding a breakdown voltage of the second electrical storage layer across the second electrical storage layer.

In another embodiment, the second electrical storage layer comprises a plurality of semiconductor parts (e.g., parts comprising at least one doped semiconductor layer) arranged electrically in series between the porous conductor substrate and conductor layer, each semiconductor part having associated therewith a threshold voltage at which its electrical behavior changes from electrically insulative to electrically conductive.

In one embodiment, the second electrical storage layer has a relative permittivity lower than that of the first electrical storage layer.

In one embodiment, the second electrical storage layer comprises a solid.

In one embodiment, the second electrical storage layer comprises a fluid (e.g., gas).

In one embodiment, the insulator layer further comprises a third electrical storage layer located on an opposed side of the first electrical storage layer to the second electrical storage layer, the third electrical storage layer being configured to change between an electrically insulative configuration and an electrically conductive configuration, with transition from the electrically insulative configuration to the electrically conductive configuration occurring in response to application of the voltage across the porous conductor substrate and the conductor layer (e.g., with the third electrical storage layer having a transition voltage at or below the component of the threshold voltage across the third electrical storage layer prior to the transition from the electrically insulative configuration to the electrically conductive configuration).

In one embodiment, the second and third electrical storage layers have different electrical properties (e.g., one is chosen for its ability to accept electrons while the other is chosen for its ability give up electrons).

In one embodiment, at least one of the first, second and third electrical storage layers are formed with substantially uniform thickness.

In accordance with a second aspect of the present invention, there is provided a method of manufacturing energy storage apparatus comprising: providing a porous conductor substrate, providing an insulator layer in contact with inner surfaces of the porous conductor substrate, and providing a conductor layer in contact with outer surfaces of the insulator layer.

In one embodiment, the step of exposing the insulator layer to inner surfaces of the porous conductor substrate comprises forming the insulator layer on inner surfaces of the porous conductor substrate.

In one embodiment, the step of providing the conductor layer comprises forming a conductor layer on outer surfaces of the insulator layer.

In one embodiment, the porous conductor substrate remains porous after the step of forming the insulator layer.

In one embodiment, the step of forming the conductor layer comprises applying a conductor material to the outer surfaces of the insulator layer.

In one embodiment, the step of applying the insulator layer comprises: applying a first coating of insulator material to inner surfaces of the porous conductor substrate, and after the first coating of insulator material is substantially fully formed, applying a second coating of insulator material to outer surfaces of the first coating of insulator material.

In one embodiment, the step of applying the insulator layer further comprises: after the second coating of insulator material is substantially fully formed, applying a third coating of insulator material to outer surfaces of the second coating of insulator material.

In one embodiment, the porous conductor substrate defines a network of interconnecting voids extending from one lateral side of the porous conductor substrate to an opposed lateral side of the porous conductor substrate.

In one embodiment, the insulator layer is additionally formed on (e.g., applied to) exterior surfaces of the porous conductor substrate.

In one embodiment, at least one applying step comprises applying by thin film deposition (e.g., by atomic layer deposition).

In one embodiment, each of the layers is formed with a substantially uniform thickness.

In one embodiment, the porous conductor substrate has an average effective pore diameter of between 10 nm and 300 nm (e.g., 20 nm to 100 nm or 50 nm to 100 nm).

In one embodiment, the structure is formed by a sol-gel process.

In one embodiment, the structure is a carbon aerogel.

In one embodiment, each of the first to third insulator layers has a thickness of between 2 nm and 10 nm (e.g., around 4 nm).

In one embodiment, the step of applying the insulator layer comprises applying a first layer formed from a first insulator material and applying a second layer formed from a second insulator material different from the first material (e.g., after the first layer is formed).

In one embodiment, the first insulator material has a higher dielectric strength than the second insulator material (e.g., at least 10 times, at least 50 times or at least 100 times the dielectric strength of the second material). In one embodiment, the first insulator material comprises silicon oxide or diamond-like carbon.

In one embodiment, the second material has a higher dielectric constant than the first material. In one embodiment, the second material comprises strontium titanate, titanium oxide or a polymer layer.

In one embodiment, at least one or both of the first and second layers has a thickness less than about 50 nm (e.g., less than about 20 nm). In one embodiment, at least one of the first and second layers has a thickness of approximately 10 nm.

In one embodiment, each or at least one of the first and second layers has a thickness greater than about 5 nm.

In one embodiment, the second layer has a thickness that is substantially equal to or less than the thickness of the first layer.

In one embodiment, the step of applying the insulator layer further comprises applying to the second layer a third layer formed from an insulator material different from the second insulator material.

In one embodiment, the third layer has a higher dielectric field strength than the second insulator material (e.g., at least 10 times, at least 50 times or at least 100 times the dielectric strength of the second material). In one embodiment, the third layer is formed from the same material as the first layer.

In one embodiment, the porous conductor substrate comprises a substantially planar body defining a central longitudinal axis and the step of forming (e.g., applying) at least one of the layers comprises rotating the porous conductor substrate relative to a layer applicator about the central longitudinal axis.

In one embodiment, the forming step further comprises simultaneously rotating the central longitudinal axis of the porous conductor substrate relative to the layer applicator about a further axis inclined relative to the central longitudinal axis (e.g., inclined by around 45 degrees to the central longitudinal axis).

In one embodiment, the porous conductor substrate is rotated about the central longitudinal axis and further axis at frequencies that are equal or harmonic frequencies.

In accordance with a third aspect of the disclosure, there is provided a capacitor comprising first and second conductor parts separated by an insulator layer, wherein the insulator layer comprises a first layer formed from a first insulator material and a second layer formed from a second insulator material different from the first material.

In one embodiment, the first insulator material has a higher dielectric strength than the second insulator material (e.g., at least 10 times, at least 50 times or at least 100 times the dielectric strength of the second material). In one embodiment, the first insulator material comprises silicon oxide or diamond-like carbon.

In one embodiment, the second material has a higher dielectric constant than the first material. In one embodiment, the second material comprises strontium titanate, titanium oxide or a polymer layer In one embodiment, at least one or both of the first and second layers has a thickness less than about 50 nm (e.g., less than about 20 nm). In one embodiment, at least one of the first and second layers has a thickness of approximately 10 nm.

In one embodiment, each or at least one of the first and second layers has a thickness greater than about 5 nm (e.g., to reduce effective leakage due to quantum tunneling).

In one embodiment, the second layer has a thickness that is substantially equal to or less than the thickness of the first layer.

In one embodiment, the insulator layer further comprises a third layer formed from an insulator material different from the second insulator material and applied to the second layer.

In one embodiment, the third layer has a higher dielectric field strength than the second insulator material (e.g., at least 10 times, at least 50 times or at least 100 times the dielectric strength of the second material).

In accordance with a fourth aspect of the disclosure, there is provided an energy storage apparatus comprising: first and second spaced conductor parts operative to generate a voltage therebetween above a threshold voltage; a first electrical storage part (e.g., first electrical insulator part) located between the first and second conductor parts, the first electrical storage part being operative to store energy in a polarized configuration when the voltage is applied across the first and second conductor parts (e.g., with the first electrical storage part having a breakdown voltage above the threshold voltage); and a second electrical storage part (e.g., second electrical insulator part) located between the first electrical storage part and one of the first and second conductor parts, the second electrical storage part being configured to change between an electrically insulative configuration and an electrically conductive configuration, with transition from the electrically insulative configuration to the electrically conductive configuration occurring in response to application of the voltage across the first and second conductor parts (e.g., with the second electrical storage part having a transition voltage (at which the change from the electrically insulative configuration to the electrically conductive configuration occurs) at or below the component of the threshold voltage across the second electrical storage part prior to transition from the electrically insulative configuration to the electrically conductive configuration).

In one embodiment, the threshold voltage is at least 100 volts (e.g., at least 1000 volts or even at least 10,000 volts).

In one embodiment, the second electrical storage part is ionizable and the electrically conductive configuration is an ionized configuration generated by applying a voltage equal to or exceeding a breakdown voltage of the second electrical storage part across the second electrical storage part.

In another embodiment, the second electrical storage part comprises a plurality of semiconductor parts (e.g., parts comprising at least one doped semiconductor layer) arranged electrically in series between the first and second spaced conductor parts, each semiconductor part having associated therewith a threshold voltage at which its electrical behavior changes from electrically insulative to electrically conductive.

In one embodiment, at least one of the first and second conductor parts comprises a conductor plate.

In one embodiment, the first electrical storage part is substantially fixed relative to the first and second conductor parts.

In one embodiment, the second electrical storage part has a relative permittivity lower than that of the first electrical storage part.

In one embodiment, the second electrical storage part comprises a solid.

In one embodiment, the second electrical storage part comprises a fluid (e.g., gas).

In one embodiment, the first conductor part comprises a porous conductor substrate (e.g., with an open pore structure).

In one embodiment, the porous conductor substrate is an aerogel (e.g., conductive carbon aerogel).

In one embodiment, at least one of the first and second electrical storage parts comprises a porous structure. For example, in the case that the second electrical storage part comprises a fluid (e.g., sealed fluid), the first electrical storage part may comprise the porous structure and the fluid of the second electrical storage part may extend into the porous structure.

In one embodiment, the porous electrical storage part is an aerogel (e.g., silicon-based aerogel doped to provide the electrical attributes desired for the first and second electrical storage parts).

In one embodiment, the second electrical storage part comprises a fluid, at least one of the first and second conductor parts may include a coating (e.g., coating on an inner surface thereof facing the first electrical storage part) formed from the same material as the first electrical storage part.

In one embodiment, the apparatus further comprises a third electrical storage part (e.g., third electrical insulator part) located on an opposed side of the first electrical storage part to the second electrical storage part, the third electrical storage part being configured to change between an electrically insulative configuration and an electrically conductive configuration, with transition from the electrically insulative configuration to the electrically conductive configuration occurring in response to application of the voltage across the first and second conductor parts (e.g., with the third electrical storage part having a transition (e.g., breakdown) voltage at or below the component of the threshold voltage across the third electrical storage part prior to the transition from the electrically insulative configuration to the electrically conductive configuration).

In one embodiment, the second and third electrical storage parts have different electrical properties (e.g., one is chosen for its ability to accept electrons while the other is chosen for its ability to give up electrons).

In one embodiment, at least one of the first, second and third electrical storage parts are formed in substantially uniform layers.

BRIEF DESCRIPTION OF THE DRAWINGS

Embodiments of this disclosure will now be described by way of example with reference to the accompanying drawings in which.

DETAILED DESCRIPTION

Figure 1:
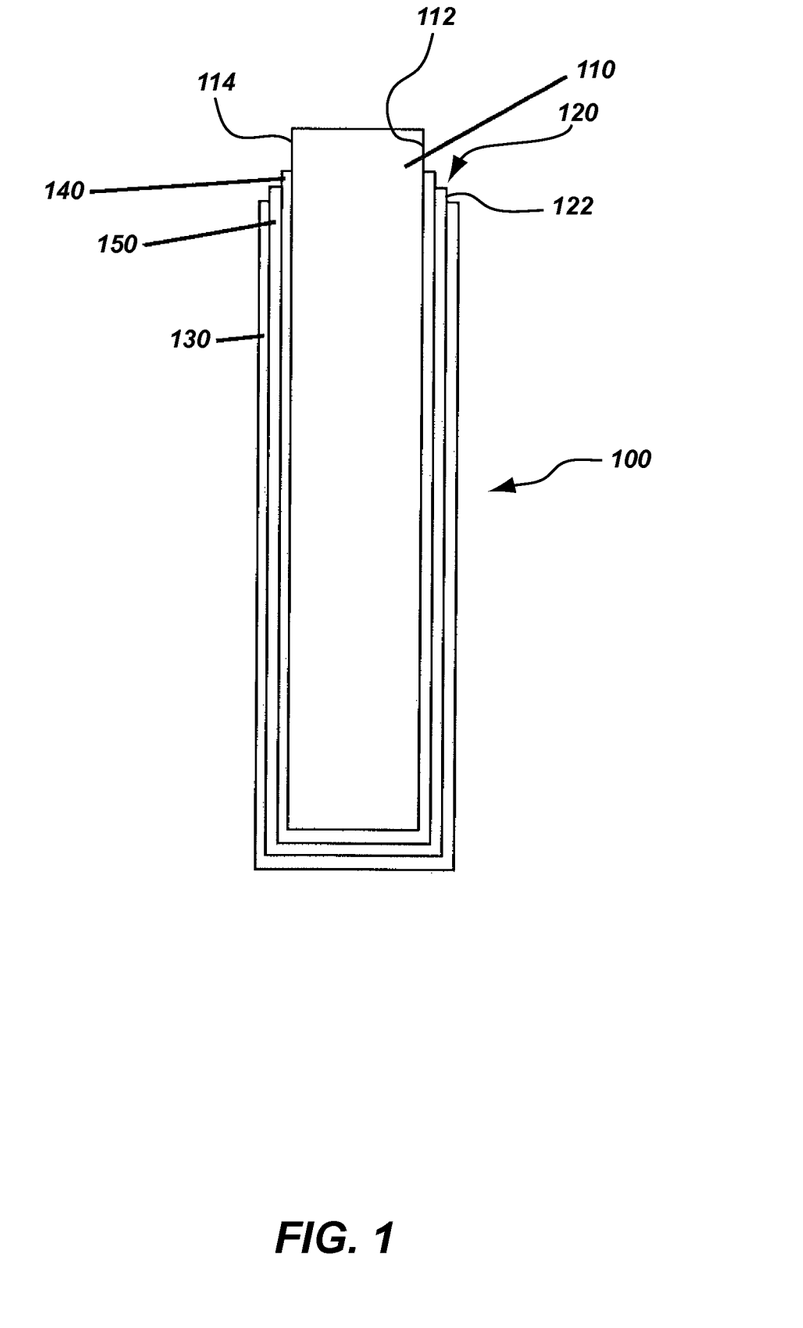
FIG. 1 shows a schematic cross-sectional side view of an energy storage apparatus according to a first embodiment of the disclosure.

FIG. 1 shows energy storage apparatus 100 comprising a substantially planar porous conductor substrate 110, a solid insulator layer 120 formed on inner surfaces 112 and outer surfaces 114 of the porous conductor substrate 110, and a solid outer conductor layer 130 formed on outer surfaces 122 of the insulator layer 120.

Porous conductor substrate 110 defines a network of interconnected voids (e.g., with each void being connected to an outer surface of the porous conductor substrate), the network of interconnecting voids extend from one lateral side of the porous conductor substrate to an opposed lateral side of the porous conductor substrate. In one embodiment, porous conductor substrate 110 is a conductive carbon aerogel (e.g., formed by a sol-gel process) and has an average effective pore diameter of between 10 nm and 300 nm (e.g., 20 nm to 100 nm or 50 nm to 100 nm).

Insulator layer 120 comprises: an inner electrical storage layer 140 formed direct on porous conductor substrate 100 and configured to change between an electrically insulative configuration and an electrically conductive configuration, with transition from the electrically insulative configuration to the electrically conductive configuration occurring in response to application of a voltage exceeding a threshold voltage across the porous conductor substrate 110 and the outer conductor layer 130; and an outer electrical storage layer 150 operative to store energy in a polarized configuration when the voltage is applied across the porous conductor substrate 110 and conductor layer 130.

Inner electrical storage layer 140 may comprise an ionizable solid.

Outer electrical storage layer 150 may comprise a dielectric material.

Figure 2:
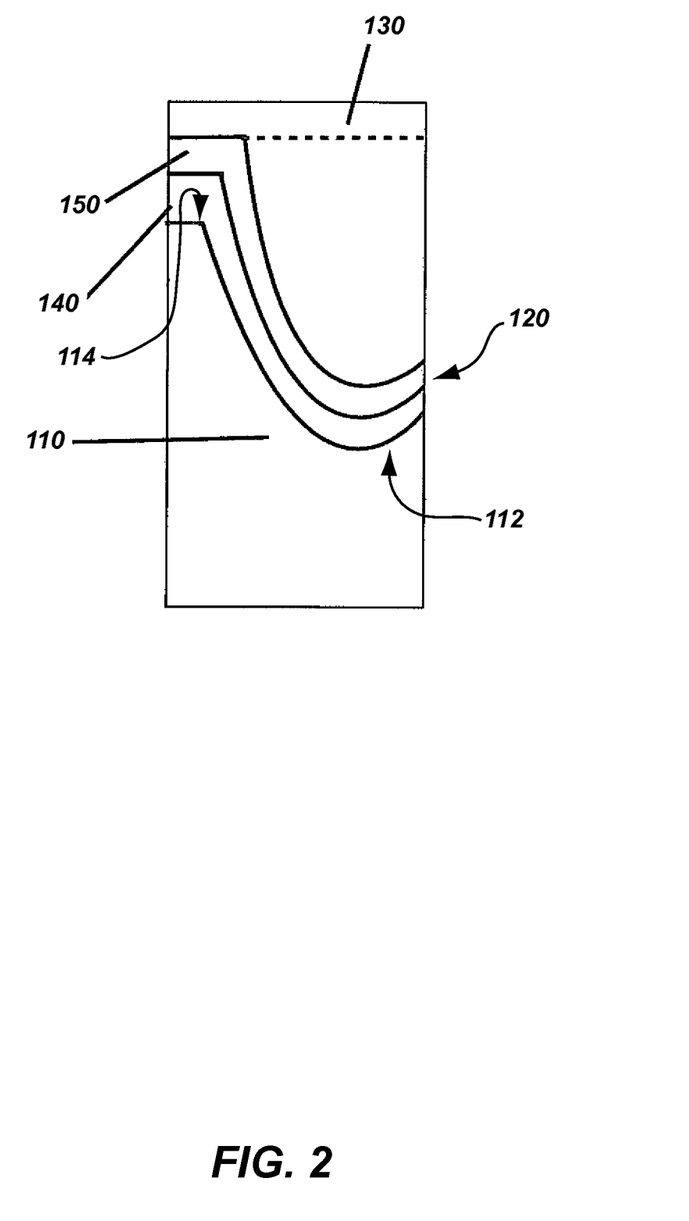
FIG. 2 shows details of the structure of the energy storage apparatus of FIG. 1.

As shown in FIG. 2, inner and outer electrical storage layers 140, 150 each have a cross-sectional thickness, which are small relative to the pore size of the porous conductor substrate 110, and penetrate into porous conductor substrate 110. Outer conductor layer 130 may have a much larger cross-sectional thickness but due to the small cross-sectional thickness of the inner and outer electrical storage layers 140, 150, still penetrates into porous conductor substrate 110. In this way, a substantial surface contact area is provided between each pair of adjacent layers.

Each of inner and outer electrical storage layers 140, 150 comprise three sequentially applied coatings of electrical storage layer material. In this way, risk of defects or "pinholes" extending through the total thickness of the insulator layer may be reduced since any one layer is unlikely to form defects in the same location on three separately formed layers. In one embodiment, each of the first to third coatings of electrical storage material has a thickness of between 2 nm and 10 nm (e.g., around 4 nm). In this way, the dielectric strength of each coating may be optimized as generally the dielectric strength properties of a material will usually improve (per thickness) with reduction in thickness.

Figure 3:
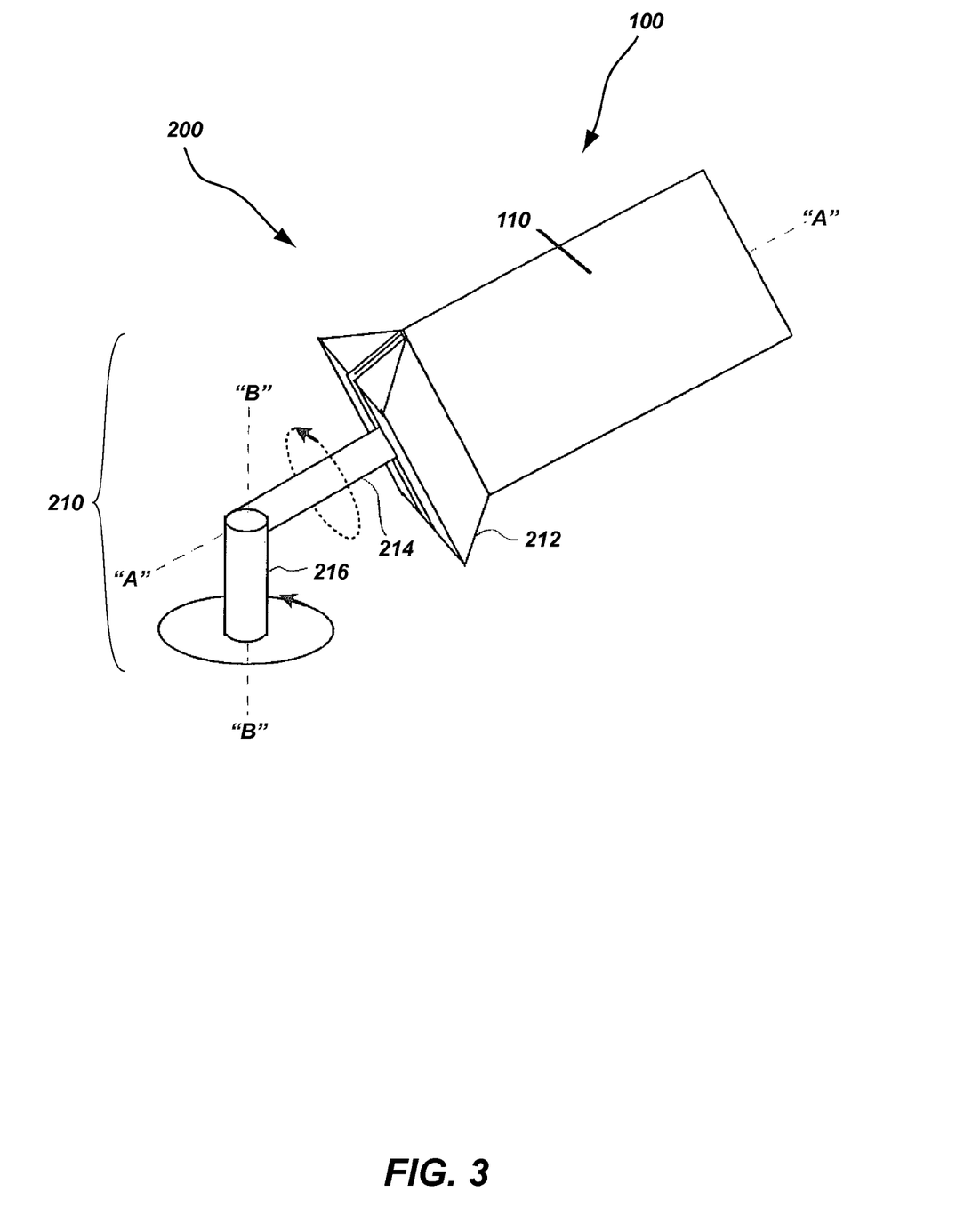
FIG. 3 illustrates apparatus used in a stage in manufacture of the energy storage apparatus of FIG. 1.

FIG. 3 illustrates apparatus 200 used in the manufacture of the energy storage apparatus 100 of FIG. 1 during formation of inner and outer electrical storage layers 140, 150 (see FIG. 1). Apparatus 200 comprises mounting apparatus 210 for holding porous conductor substrate 110 and a layer applicator 220 (not shown, e.g., atomic layer deposition applicator).

Mounting apparatus 210 includes a vice part 212 configured to grip one edge of porous conductor substrate 110, a first rotary part 214 configured to rotate vice part 212 relative to layer applicator 220 around a first rotary axis extending along a central longitudinal axis of porous conductor substrate 110 and a second rotary part 216 configured to rotate first rotary part 214 around a second rotary axis inclined relative to the central longitudinal axis (e.g., inclined by around 45 degrees to the central longitudinal axis).

In one embodiment, mounting apparatus 210 is configured to rotate porous conductor substrate 110 about the central longitudinal axis "A" and further axis "B" at frequencies that are equal or harmonic frequencies.

Figure 4:
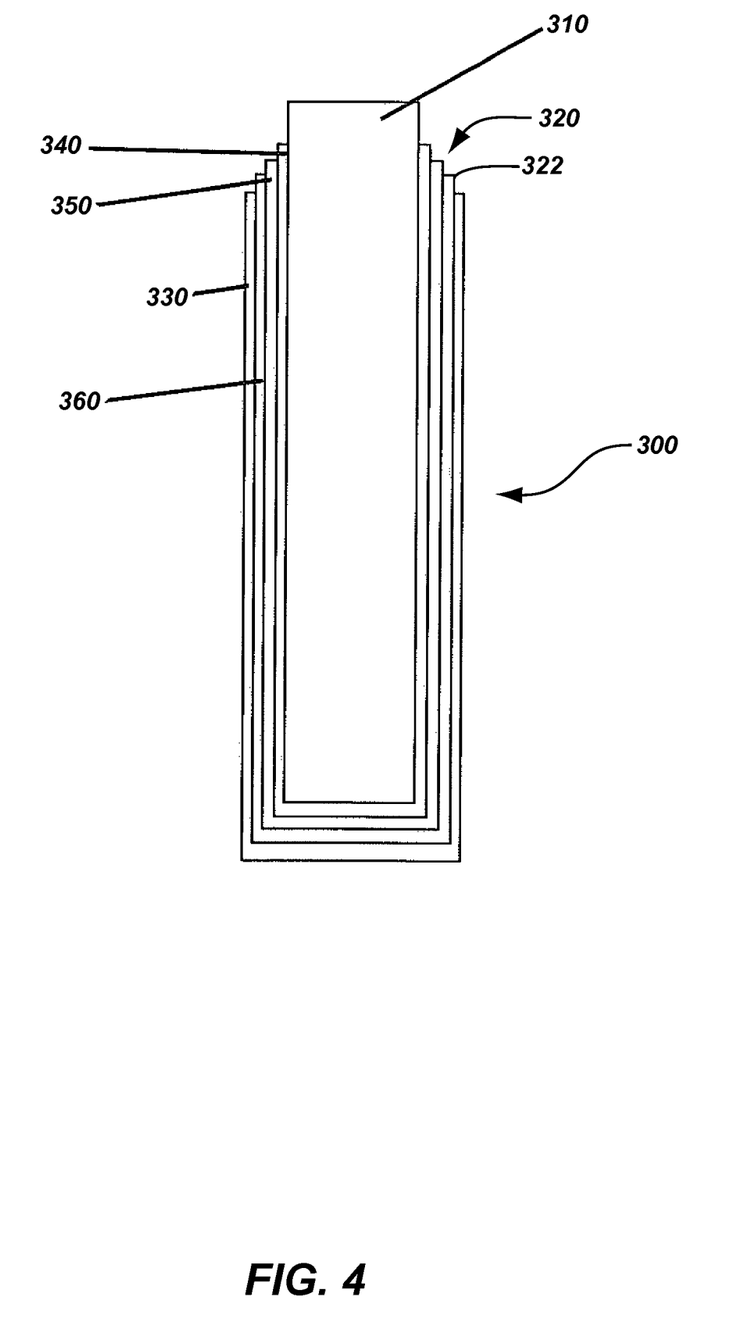
FIG. 4 shows a schematic cross-sectional side view of the energy storage apparatus according to a second embodiment of the disclosure.

FIG. 4 shows energy storage apparatus 300 based on energy storage apparatus 100 of FIG. 1 and comprising a substantially planar porous conductor substrate 310, a solid insulator layer 320 formed on inner and outer surfaces of the porous conductor substrate 310, and a solid outer conductor layer 330 formed on outer surfaces 322 of the insulator layer 320.

Insulator layer 320 includes an inner electrical storage layer 340 formed directly on porous conductor substrate 300 and configured to change between an electrically insulative configuration and an electrically conductive configuration, with transition from the electrically insulative configuration to the electrically conductive configuration occurring in response to application of a voltage exceeding a threshold voltage across the porous conductor substrate 310 and the outer conductor layer 330; a central electrical storage layer 350 operative to store energy in a polarized configuration when the voltage is applied across the porous conductor substrate 310 and conductor layer 330; and an outer electrical storage layer 360 configured (like inner electrical storage layer 340) to change between an electrically insulative configuration and an electrically conductive configuration, with transition from the electrically insulative configuration to the electrically conductive configuration occurring in response to application of a voltage exceeding the threshold voltage across the porous conductor substrate 310 and the outer conductor layer 330.

As with energy storage apparatus 100, inner, central and outer electrical storage layers 340, 350, 360 comprise three sequentially applied coatings of electrical storage layer material in order to reduce risk of defects or "pinholes" as previously discussed.

Figure 5:
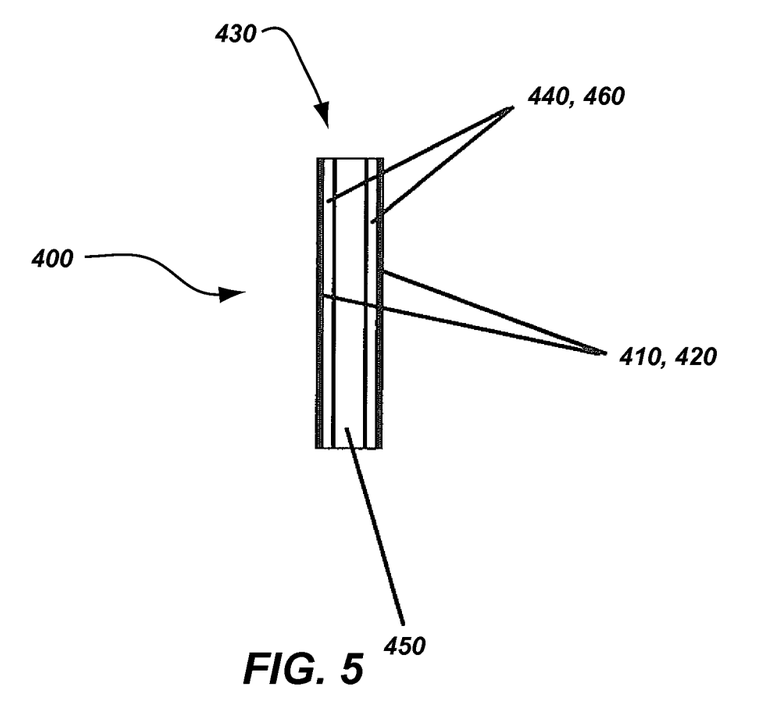
FIG. 5 shows a schematic cross-sectional side view of the energy storage apparatus according to a third embodiment of the disclosure.

FIG. 5 shows energy storage apparatus 400 comprising first and second conductor plates 410, 420 separated by an insulator structure 430.

Insulator structure 430 comprises: a first solid electrical storage layer 440 configured to change between an electrically insulative configuration and an electrically conductive configuration, with transition from the electrically insulative configuration to the electrically conductive configuration occurring in response to application of a voltage exceeding a threshold voltage across the first and second conductor plates 410, 420; a central solid electrical storage layer 450 operative to store energy in a polarized configuration when the voltage is applied across the first and second conductor plates 410, 420; and a second solid electrical storage layer 460 configured (like first electrical storage layer 440) to change between an electrically insulative configuration and an electrically conductive configuration, with transition from the electrically insulative configuration to the electrically conductive configuration occurring in response to application of a voltage exceeding the threshold voltage across the first and second conductor plates 410, 420.

Figure 6:
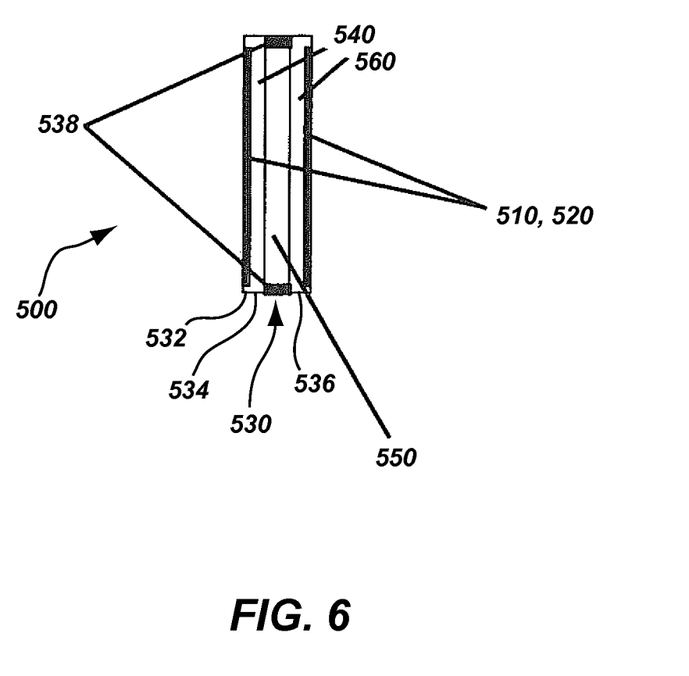
FIG. 6 shows a schematic cross-sectional side view of the energy storage apparatus according to a third embodiment of the disclosure.

FIG. 6 shows energy storage apparatus 500 comprising first and second conductor plates 510, 520 separated by an insulator structure 530.

Insulator structure 530 comprises: a housing 532 comprising a first chamber 534 containing a first electrical storage fluid 540 (e.g., liquid or gas) configured to change between an electrically insulative configuration and an electrically conductive configuration, with transition from the electrically insulative configuration to the electrically conductive configuration occurring in response to application of a voltage exceeding a threshold voltage across the first and second conductor plates 510, 520; a central solid electrical storage layer 550 operative to store energy in a polarized configuration when the voltage is applied across the first and second conductor plates 510, 520; a second chamber 536 containing a second electrical storage fluid 560 configured (like first electrical storage fluid 540) to change between an electrically insulative configuration and an electrically conductive configuration, with transition from the electrically insulative configuration to the electrically conductive configuration occurring in response to application of a voltage exceeding the threshold voltage across the first and second conductor plates 510, 520; and seals 538 for isolating first and second chambers 534, 536 to prevent mixing of first and second electrical storage fluids 540, 560.

In one embodiment, first and second electrical storage fluids 540, 560 comprise an ionizable gas (e.g., noble gas) or ionizable liquid.

Figure 7:
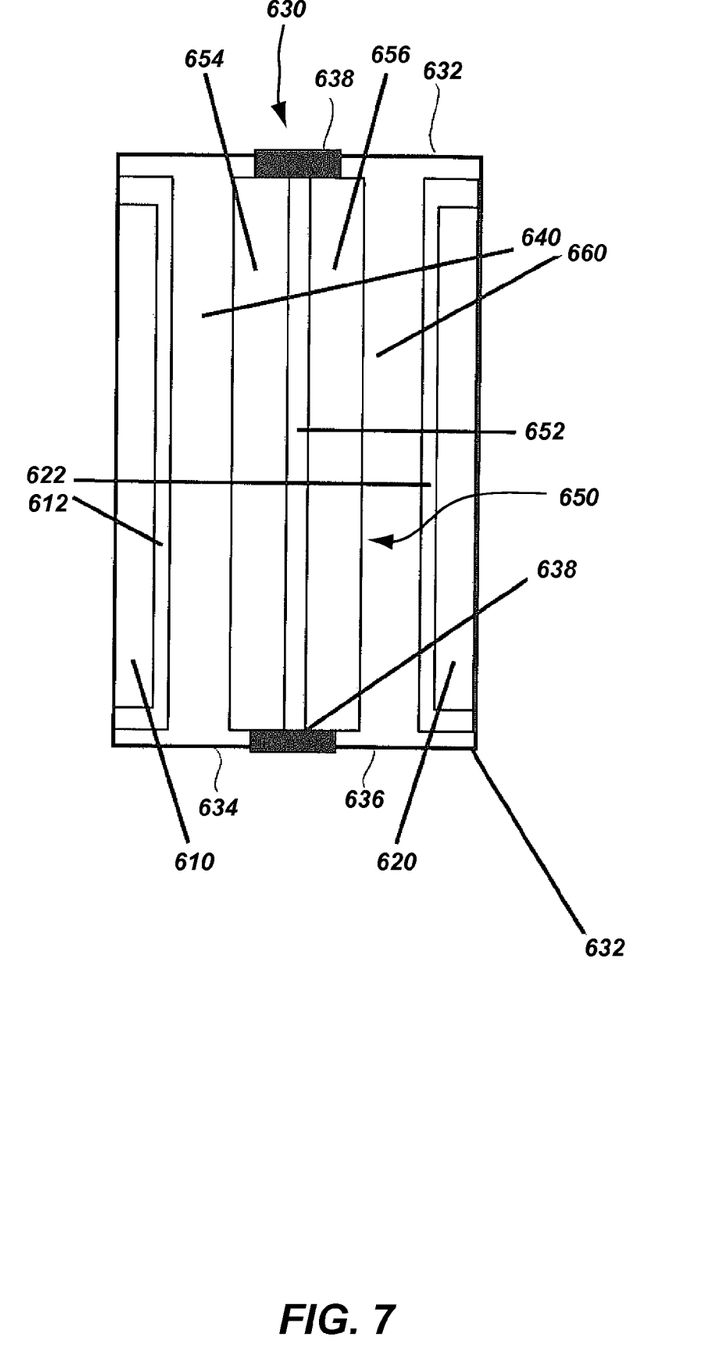
FIG. 7 shows a schematic cross-sectional side view of the energy storage apparatus according to a third embodiment of the disclosure.

FIG. 7 shows energy storage apparatus 600 comprising first and second porous conductor plates 610, 620 separated by an insulator structure 630.

Insulator structure 630 comprises: a housing 632 comprising a first chamber 634 containing a first electrical storage fluid 640 (e.g., liquid or gas) configured to change between an electrically insulative configuration and an electrically conductive configuration, with transition from the electrically insulative configuration to the electrically conductive configuration occurring in response to application of a voltage exceeding a threshold voltage across the first and second porous conductor plates 610, 620; a central solid electrical storage layer 650 operative to store energy in a polarized configuration when the voltage is applied across the first and second porous conductor plates 610, 620; a second chamber 636 containing a second electrical storage fluid 660 configured (like first electrical storage fluid 540) to change between an electrically insulative configuration and an electrically conductive configuration, with transition from the electrically insulative configuration to the electrically conductive configuration occurring in response to application of a voltage exceeding the threshold voltage across the first and second porous conductor plates 610, 620; and seals 638 for isolating first and second chambers 634, 636 to prevent mixing of first and second electrical storage fluids 640, 660.

In order to maximize the contact area between first and second electrical storage fluids 640, 660 and central solid electrical storage layer 650, central solid electrical storage layer 650 comprises a central high k dielectric part 652 and first and second outer porous high k dielectric parts 654, 656 into which first and second electrical storage fluid 640, 660 penetrate.

With continued reference to FIG. 7, first and second electrical storage fluids 640, 660 comprise an ionizable gas (e.g., noble gas) or ionizable liquid.

In order to reduce the effect of any material deposition resulting from the ionization of first and second electrical storage fluids 640, 660, first and second porous conductor plates 610, 620 include first and second outer coatings 612, 622 formed from the same material as first and second outer porous high k dielectric parts 654, 656. When the apparatus is used in a cyclic (e.g., AC) manner, the polarity reversals will act to revise any material transfer.

The invention claimed is:
1. An energy storage apparatus comprising:
a porous conductor substrate defining a network of interconnected voids connected to an outer surface of the porous conductor substrate and defining inner surfaces of the porous conductor substrate;

an insulator layer in contact with inner surfaces of the porous conductor substrate; and a conductor layer in contact with outer surfaces of the insulator layer;

wherein:

the insulator layer comprises a first electrical storage layer operative to store energy in a polarized configuration when a voltage is applied across the porous conductor substrate and conductor layer; and the insulator layer further comprises a second electrical storage layer configured to change between an electrically insulative configuration and an electrically conductive configuration, with transition from the electrically insulative configuration to the electrically conductive configuration occurring in response to application of a voltage exceeding a threshold voltage across the porous conductor substrate and the conductor layer, wherein the threshold voltage is at least 100 volts.

2. The energy storage apparatus according to claim 1, wherein the insulator layer is additionally in contact with the outer surface of the porous conductor substrate.

3. The energy storage apparatus according to claim 1, wherein the insulator layer is formed on the inner surfaces of the porous conductor substrate.

4. The energy storage apparatus according to claim 3, wherein the conductor layer is formed on the outer surfaces of the insulator layer.

5. The energy storage apparatus according to claim 3, wherein the insulator layer forming the first electrical storage layer comprises first and second sequentially applied coatings of insulator material.

6. The energy storage apparatus according to claim 5, wherein the insulator layer further comprises a third coating applied after the second coating of insulator material.

7. The energy storage apparatus according to claim 5, wherein each of the coatings of insulator material has a thickness of between 2 nm and 10 nm.

8. The energy storage apparatus according to claim 3, wherein the insulator layer forming the first electrical storage layer comprises a first layer formed from a first insulator material and a second layer formed from a second insulator material different from the first insulator material.

9. The energy storage apparatus according to claim 8, wherein the first insulator material has a higher dielectric strength than the second insulator material.

10. The energy storage apparatus according to claim 8, wherein the second insulator material has a higher dielectric constant than the first insulator material.

11. The energy storage apparatus according to claim 8, wherein at least one or both of the first and second layers has a thickness less than about 50 nm.

12. The energy storage apparatus according to claim 8, wherein the second layer has a thickness that is substantially equal to or less than the thickness of the first layer.

13. The energy storage apparatus according to claim 8, wherein the insulator layer forming the first electrical storage layer further comprises a third layer formed from an insulator material different from the second insulator material and applied to the second layer.

14. The energy storage apparatus according to claim 13, wherein the third layer has a higher dielectric field strength than the second insulator material.

15. The energy storage apparatus according to claim 1, wherein the second electrical storage layer is ionizable and the electrically conductive configuration is an ionized configuration generated by applying a voltage equal to or exceeding a breakdown voltage of the second electrical storage layer across the second electrical storage layer.

16. The energy storage apparatus according to claim 1, wherein the second electrical storage layer comprises a plurality of semiconductor parts arranged electrically in series between the porous conductor substrate and conductor layer, each semiconductor part having associated therewith a threshold voltage at which its electrical behavior changes from electrically insulative to electrically conductive.

17. The energy storage apparatus according to claim 1, wherein the insulator layer further comprises a third electrical storage layer located on an opposed side of the first electrical storage layer to the second electrical storage layer, the third electrical storage layer being configured to change between an electrically insulative configuration and an electrically conductive configuration, with transition from the electrically insulative configuration to the electrically conductive configuration occurring in response to application of the voltage across the porous conductor substrate and the conductor layer.

18. The energy storage apparatus according to claim 17, wherein the second and third electrical storage layers have different electrical properties.

19. An energy storage apparatus comprising:

first and second spaced conductor parts operative to generate a voltage therebetween above a threshold voltage, wherein the threshold voltage is at least 100 volts;

a first electrical storage part located between the first and second spaced conductor parts, the first electrical storage part being operative to store energy in a polarized configuration when the voltage is applied across the first and second spaced conductor parts; and a second electrical storage part located between the first electrical storage part and one of the first and second spaced conductor parts, the second electrical storage part being configured to change between an electrically insulative configuration and an electrically conductive configuration, with transition from the electrically insulative configuration to the electrically conductive configuration occurring in response to application of the voltage across the first and second spaced conductor parts; and wherein the apparatus is configured such that:

before energy is stored in the first electrical storage part by polarization, work must be done to convert the second electrical storage part from the electrically insulative configuration to the electrically conductive configuration; and the energy stored by converting the second electrical storage part from the electrically insulative configuration to the electrically conductive configuration is released as the second electrical storage part converts back to the electrically insulative configuration during a discharging stage.

20. The energy storage apparatus according to claim 19, wherein the second electrical storage part is ionizable and the electrically conductive configuration is an ionized configuration generated by applying a voltage equal to or exceeding a breakdown voltage of the second electrical storage part across the second electrical storage part.

21. The energy storage apparatus according to claim 19, wherein the second electrical storage part comprises a plurality of semiconductor parts arranged electrically in series between the first and second spaced conductor parts, each semiconductor part of the plurality having associated therewith a threshold voltage at which its electrical behavior changes from electrically insulative to electrically conductive.

22. The energy storage apparatus according to claim 19, wherein at least one of the first and second electrical storage parts comprises a porous structure.

23. The energy storage apparatus according to claim 22, wherein the first electrical storage part comprises the porous structure and the second electrical storage part comprises a fluid extending into the porous structure.

24. The energy storage apparatus according to claim 19, wherein the apparatus further comprises a third electrical storage part located on an opposed side of the first electrical storage part to the second electrical storage part, the third electrical storage part being configured to change between an electrically insulative configuration and an electrically conductive configuration, with transition from the electrically insulative configuration to the electrically conductive configuration occurring in response to application of the voltage across the first and second spaced conductor parts.

\* \* \* \* \*